Figure 1:
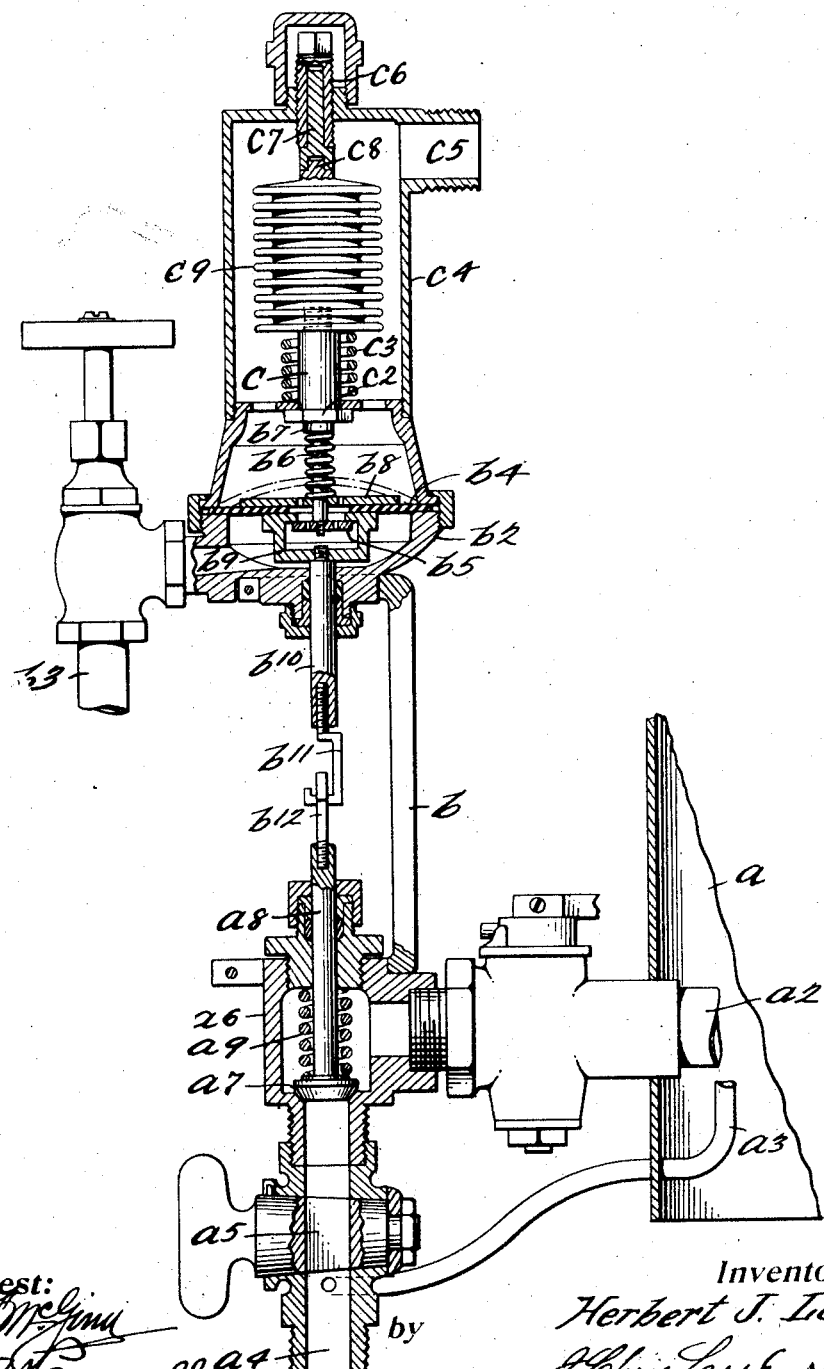

H. J. LONG.
WATER HEATER.
APPLICATION FILED DEC. 3, 1913.

1,214,559.

Patented Feb. 6, 1917.
2 SHEETS—SHEET 1.

Attest:

Inventor:
Herbert J. Long
by J. Chris Larsen Atty

H. J. LONG.
WATER HEATER.
APPLICATION FILED DEC. 3, 1913.

1,214,559.

Patented Feb. 6, 1917.
2 SHEETS—SHEET 2.

Attest:

by

Inventor:
Herbert J. Long
J. Chris Larsen Atty.

UNITED STATES PATENT OFFICE.

HERBERT J. LONG, OF NEW BRUNSWICK, NEW JERSEY.

WATER-HEATER.

1,214,559.

Specification of Letters Patent.

Patented Feb. 6, 1917.

Application filed December 3, 1913. Serial No. 804,360.

*To all whom it may concern:*

Be it known that I, HERBERT J. LONG, a citizen of the United States of America, and residing at New Brunswick, in the county of Middlesex and State of New Jersey, have invented certain new and useful Improvements in Water-Heaters, of which the following is a specification, such as will enable those skilled in the art to which it appertains to make and use the same.

This invention relates to gas-burning, water-heating, devices, and the object thereof is to provide heaters of this class in which the gas supply is automatically controlled by the temperature of the heated water.

I am aware that thermostatic means have heretofore been employed to accomplish the desired gas control but, in those of which I have knowledge, the thermostatic action is directly on the gas valve through a system of multiplying levers which is cumbersome, costly, and not always effective.

In my present device I primarily control the gas supply by means of the cold water admitted into a suitable receptacle when a faucet or the like is opened at a distant point to permit the water to pass through the heater and be heated, this control being clearly set forth in my Letters Patent of the United States bearing date of March 11, 1913, No. 1,055,478, and to which I now add a thermostatic gas control. My thermostatic control does not, however, connect directly with the gas valve but said gas valve is indirectly controlled by the direct thermostatic control of the passage of water through the heater or, more strictly, through a casing having my thermostatic element contained therein. Where a thermostatic element is in direct control of the gas supply constantly varying temperatures of the heated water results when but small quantities of water are successively discharged by the repeated turning on or off of a faucet as is usually the case in basins by reason of the fact that the gas supply is repeatedly shut off and the possibility of adjustment of gas valve action in a direct connection with a thermostat is limited but, with my direct water-controlled gas supply a constant gas supply is assured even if the faucet should be held but slightly open for considerable periods, as in a bath-tub, and the water would be heated. Certain types of heaters, in order to overcome this, provide both a water-controlled gas valve as well as a thermostatic controlled valve, thus complicating the structure, but my invention avoids this by providing a water control for the gas supply and a thermostatic control for the water control whereby the thermostatic control has no connection with the gas valve although indirectly operative thereon, or, rather, controlling the control thereof.

My invention is fully set forth in the following specification, of which the accompanying drawings form a part, in which the same parts are designated by the same reference characters in each of the views, and in which:—

Figure 2:
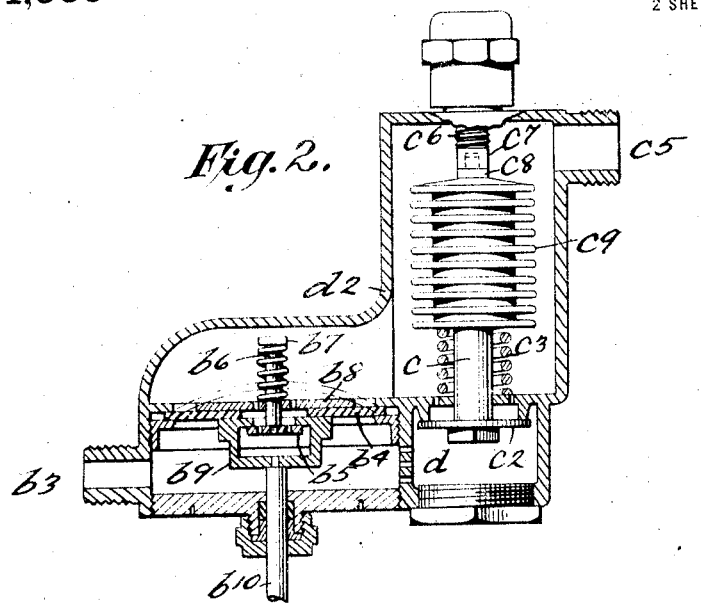
Figure 3:
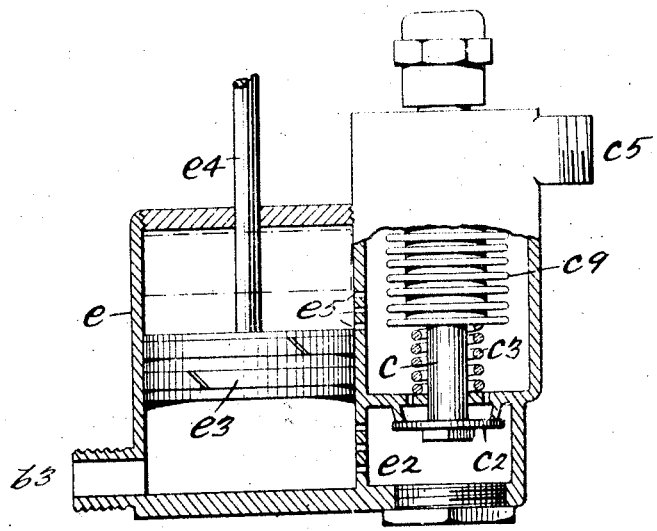

Figure 1 is a vertical section taken through one form of my invention and showing the gas valve connection; Fig. 2 is a similar view, without the gas valve, but showing a casing provided with a by-pass for the water and in which the water pressure is controlled to effect the gas supply; and Fig. 3 is a similar view of my system of gas control applied to a conventional heater and in which a plunger piston is the gas control, a by-pass also being shown in this form, although the superimposed arrangement shown in Fig. 1 could also be readily adapted to such a plunger instead of a diaphragm.

In the drawings forming a part of this application, I have shown a portion $a$ of a water heater of any desired type, and in which the usual water coils are provided, but not shown, as well as the usual gas burners and pilot light, also not shown, as these parts may be of any desired construction, but I do show a main gas supply pipe $a^2$ and a pilot pipe $a^3$ both in communication with a main pipe $a^4$ provided with a gas-cock $a^5$, both of said pipes $a^2$ and $a^4$ being in communication with a casing $a^6$ having a disk valve $a^7$ therein carried by a rod $a^8$ extending above the casing, said valve being normally held on its seat by a spring $a^9$.

Carried by a bracket $b$ is a casing $b^2$ in direct connection, at the bottom thereof, with the heater through the hot water pipe $b^3$, a diaphragm $b^4$ dividing said casing into upper and lower compartments, said diaphragm being provided with a relatively large central opening therethrough normally closed by a disk $b^5$, perforated as shown, and mounted on a spring controlled rod $b^6$ having a head $b^7$ at the upper end thereof, and said diaphragm carries a plate, perforated, $b^8$ on the upper side thereof and a yoke $b^9$ on the lower side thereof and which, in turn, carries a rod $b^{10}$ in line with the rod $a^8$ and connected therewith by adjustable hooks $b^{11}$ and $b^{12}$ whereby the action of the diaphragm upwardly by the water pressure thereunder may adjustably control upward movement of the disk valve $a^7$ to open the main gas supply to the heater $a$, all the parts thus far described being more explicitly set forth in the patent referred to.

The top of the upper compartment in the casing $b^2$ is provided with water passages and with a central opening for a rod $c$ freely movable therein, said rod being provided with a plate on the lower side thereof within the casing $b^2$ and which plate is normally held against the top of said casing by means of a spring $c^3$, said plate being designated $c^2$, and the head $b^7$ of the rod $b^6$ impinges on the plate $c^2$.

Mounted on the casing $b^2$ is a cylindrical chamber $c^4$ having an outlet $c^5$ adapted for connection with the faucet, and having a central opening in the top thereof for an adjusting screw $c^6$ threaded externally for engagement with the cylinder $c^4$ and internally for engagement with a screw $c^7$ which is in turn hollowed at its lower end to receive a post $c^8$ on a thermostatic element $c^9$, and I prefer to cap the adjusting screw $c^6$, as shown, for its protection.

The rod $c$ is threaded into the lower side of the thermostat which, in the form shown, consists of a hollow casing having a plurality of hollow flanges connected therewith and containing a suitable liquid, such as alcohol, which expands under the influence of heat and forces the ends of the casing apart in the nature of a bellows and, if I desire a high water temperature, I adjust the screws $c^6$ and $c^7$ so as to permit an upward movement of the upper end of the thermostat in a degree corresponding to the desired water temperature, after which upward movement of the upper end against no resistance until further movement is prevented by the said screws the lower end of the thermostat moves downwardly against the springs on the rods $c$ and $b^6$, thus moving the disk valve $b^5$ away from its seat and permitting a relatively free flow of the water through the diaphragm and lowering the water pressure under the diaphragm whereby it may return to normal position, this being assisted by the spring $a^9$ and the valve $a^4$ is seated and the gas supply shut off to the heater. When a faucet at a distant point is opened the water passes thereto through the casing $b^2$, cylinder $c^4$, and heater $a$ and, as the water pressure under the diaphragm raises the latter, the gas valve is opened and the supply in the heater ignited at the main burners by the pilot burner whereby the water is instantly heated but, in this flexing of the diaphragm, the disk valve $b^5$ is correspondingly moved from its seat to permit a flow of water through the diaphragm equal to the amount being drawn at the faucet, because of the fact that the rod $b^6$ impinges on the plate of the rod $c$ which cannot move upwardly, and a constant gas supply results as long as the faucet is open and the instant the faucet is closed the diaphragm returns to its normal or unflexed position and the gas supply is closed. As stated, the thermostat expansion upwardly is under adjustment and if no upward expansion is permitted then full downward expansion results with a consequent result on the valve $b^5$, diaphragm, and gas supply, and the gas supply is curtailed at a lower water temperature than if the upward thermostat expansion was permitted, and it will thus be seen that the temperature of the water, within the limits of the thermostat, is under control, adjustably, and the thermostat effect on the gas valve is rendered possible only through the thermostat control of the flow of water through the diaphragm, and a simple, inexpensive, and very efficient automatic control results.

In Fig. 2 I have shown a modification whereby the water is diverted through a by-pass $d$ in a casing $d^2$ by the thermostat expansion to decrease the pressure under the diaphragm of water and thereby, as already described, reduce or close the gas supply, this arrangement of the by-pass being preferable under some conditions and, while I prefer to use the gas valve mechanism described, inasmuch as it is protected by Letters Patent, I do not limit myself to any specific form thereof as I may adapt my system of control to conventional forms now on the market with little or no alteration thereof.

In the form shown in Fig. 3 a casing $e$ is employed with a by-pass $e^2$ and a piston $e^3$ instead of the diaphragm, the piston-rod $e^4$ being in operative connection with the gas valve, and in this form the piston must be moved upwardly by the water pressure behind the same sufficiently far to be enabled to pass through ports $e^5$ until the thermostat expansion relieves this pressure by permitting the water to pass through the by-pass by the opening of the valve therein, and I may just as readily, although a showing thereof has not been deemed necessary, carry out the superimposed arrangement shown in Fig. 1, but with the piston substituted for the diaphragm.

All these forms show a thermostat control of a water controlled gas supply, the water control being fully effective independently of the thermostat until a predetermined temperature of the water has been reached, after which the thermostat controls the gas supply through its water control.

Having fully described my invention, what I claim as new, and desire to secure by Letters Patent, is:—

1. A water heater provided with a gas supply, a valve for the latter, a casing, a movable perforated element dividing said casing, means for connecting said element with said gas valve, a leaky valve connection for controlling the perforation in said element, a water inlet conduit on one side of said element, a water outlet conduit on the opposite side of said element, one of said conduits being in connection with the heater, and a thermostat in said last mentioned conduit, said element being adapted to be moved in the assumed direction by a reduction of pressure on the outlet side of said element to open said gas valve, said thermostat being adapted to reduce the pressure on the inlet side of said element to permit a return thereof toward normal position to correspondingly throttle said gas valve.

2. In a water heater provided with a gas supply, a valve therefor, a casing, a flexible element dividing said casing into compartments and provided with an opening, means for maintaining said element in normal position, means for connecting said element with said gas supply valve, a perforated water valve controlling the opening in said element, a water inlet pipe beneath said element, a discharge conduit above said element, the latter adapted to move upwardly by a reduction of pressure thereover to open said gas valve, and a thermostat in operative connection with said water valve above said element and adapted to open said water valve to reduce the pressure beneath said element and permit the latter to move toward normal position to correspondingly throttle the gas supply valve.

In testimony that I claim the foregoing as my invention I have signed my name in presence of the subscribing witnesses this 8th day of October, 1913.

HERBERT J. LONG. [L. S.]

Witnesses:
J. V. LANDRETH,
WM. E. LEARY, Jr.